Nov. 24, 1931.  S. BLASKI  1,833,818
CURTAIN ROD BRACKET
Filed July 30, 1931
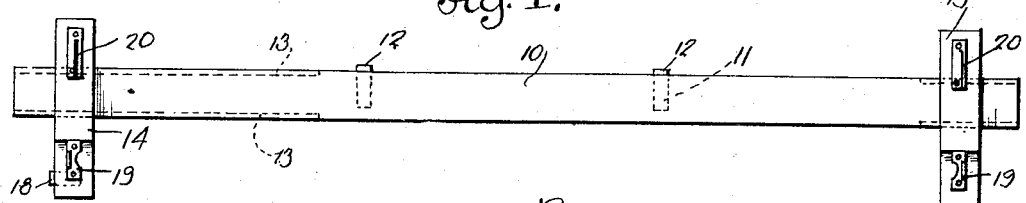
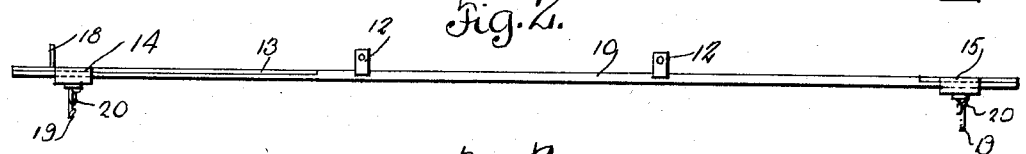
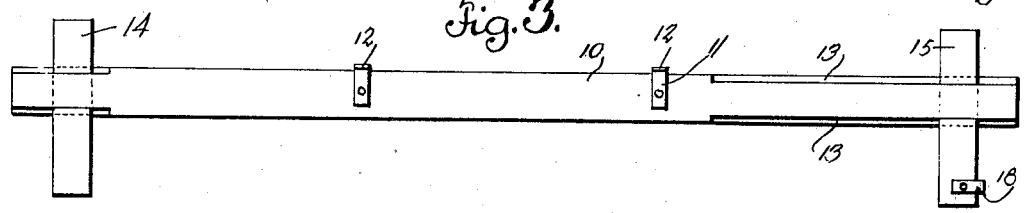
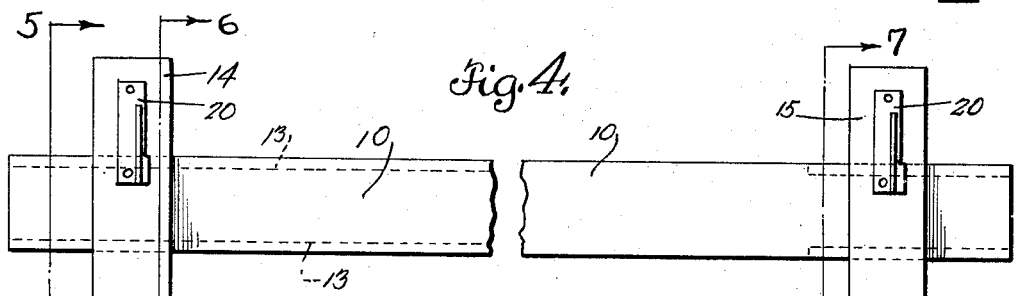
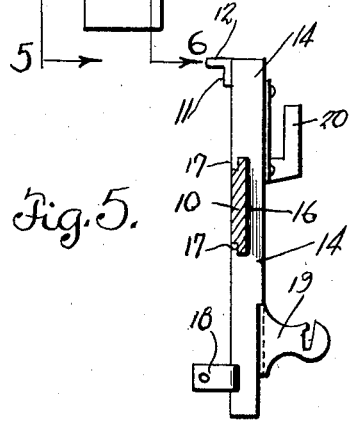
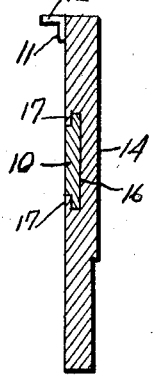
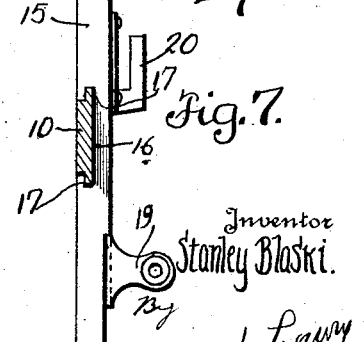
Inventor
Stanley Blaski.
By Bryant & Lowry
Attorneys Patented Nov. 24, 1931

1,833,818

UNITED STATES PATENT OFFICE

STANLEY BLASKI, OF DETROIT, MICHIGAN

CURTAIN ROD BRACKET

Application filed July 30, 1931. Serial No. 554,136.

This invention relates to certain new and useful improvements in curtain rod brackets.

The primary object of the invention is to provide a curtain rod bracket for the support of shade rollers and curtain rods and comprising a bar or strip member carrying angle lugs for attachment to a window frame and bracket members upon which the shade roller and curtain rod supports are attached with one of the bracket members adjustable upon the bar or strip member for centering the brackets relative to a window frame.

A further object of the invention is to provide a curtain rod bracket of the foregoing character wherein an angularly directed lug carried by the adjustable bracket member is adapted to be secured to the side of the window frame for anchoring the bracket in position and also constituting additional securing means for the bar or strip member.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of a curtain rod bracket constructed in accordance with the present invention, showing the bar or strip member upon which the shade roller and curtain rod brackets are mounted;

Figure 2 is a top edge elevational view of the same;

Figure 3 is a rear elevation view, showing the interfitting connection between the bar or strip member and the bracket;

Figure 4 is a fragmentary enlarged front elevational view;

Figure 5 is a cross-sectional view taken on line 5—5 of Figure 4 with the anchor lug for the adjustable bracket;

Figure 6 is a cross-sectional view taken on line 6—6 of Figure 4, showing the sliding interlocking connection between the bracket and the bar or strip member; and Figure 7 is a cross-sectional view taken on line 7—7 of Figure 4.

Referring more in detail to the accompanying drawings, there is illustrated a curtain rod bracket adapted for attachment to a window frame and comprising a relatively thin strip member or bar 10 of a length to permit association with window frames of different widths, one or more angle lugs 11 being secured to the rear face of the bar 10 and having apertured extensions 12 as shown in Figure 2 adapted to be engaged with the upper edge of a window frame for securing the bar in position.

The upper rear corner edges of the bar 10 are longitudinally rabbeted as at 13 at opposite ends thereof and bracket plates 14 and 15 are slidably associated with the bar and extend transversely thereof, each having a cross groove 16 in its rear side to receive the bar 10 with a flange 17 at each side of the groove 16 to extend into the rabbeted edge of the bar as illustrated in Figure 6. The bracket plate 15 may be permanently anchored in position at one end of the bar 10 while the bracket plate 14 at the other end of the bar is adapted to be shifted over the bar to accommodate the mounting of the curtain rod bracket upon window frames of different widths. As shown in Figure 5, an angle lug 18 is carried by the outer side edge of the lower end of the bracket plate 14 to be secured to the side of a window frame so that when the bar 10 is in position on a window frame, the same is so retained by the angle lugs 12 and 18. Each bracket plate 14 and 15 carries a shade roller bracket arm 19 adjacent its lower end and a curtain rod supporting arm 20 adjacent its upper end.

From the above detailed description of the invention, it is believed that the construction and operation thereof will be apparent, it being noted that the elongated strip member or bar 10 is secured to a window frame by the angle lugs 12 engaged with the upper side of the window frame and the angle lug 18 carried by the bracket plate 14 engaged with one side edge of the window frame. The bracket plate 15 is preferably anchored in position after being mounted upon the rabbeted end of the bar 10 while the bracket plate 14 is adjustable upon the opposite rabbeted end of the bar 10 for correctly positioning the two bracket plates relative to a window frame, the bracket plate 14 being anchored in position by the angle lug 18 carried thereby.

While there is herein shown and described the preferred embodiment of the invention, it is nevertheless to be noted that minor changes may be made therein without departing from the spirit and scope of the invention as claimed.

I claim:—

In a curtain rod bracket, an elongated bar having longitudinally extending rabbeted edges adjacent each end, a bracket plate extending transversely of each end of the bar and transversely grooved on one face for sliding interlocking engagement with the bar, angle lugs on the upper edge of the bar for attaching the bar to a window frame, and additional attaching means carried by one of the bracket plates.

In testimony whereof I affix my signature.

STANLEY BLASKI.